Sept. 26, 1961 C. ULMANN 3,001,247
SYSTEMS FOR CONTROLLING SLIDING GLASS PANES
Filed May 15, 1958 3 Sheets-Sheet 2

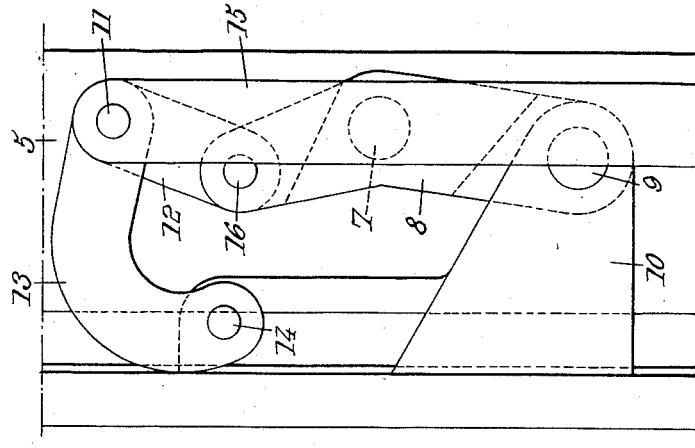
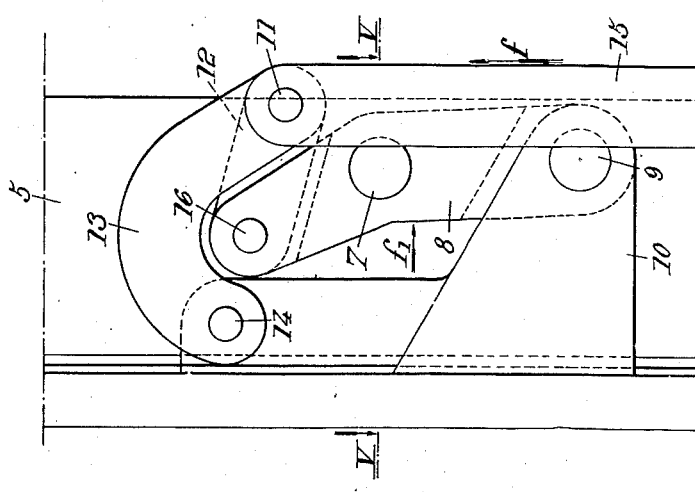
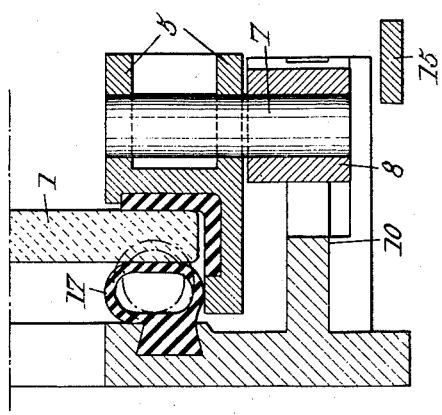

United States Patent Office 3,001,247
Patented Sept. 26, 1961

3,001,247
SYSTEMS FOR CONTROLLING SLIDING GLASS PANES
Charles Ulmann, Paris, France, assignor to Etablissements Georges Klein & Cie, Paris, France, a French society
Filed May 15, 1958, Ser. No. 735,536
Claims priority, application France May 18, 1957
2 Claims. (Cl. 20—52.3)

The present invention relates to systems for controlling sliding glass panes of the kind including a device for locking or holding the glass panes in position with respect to the frame in which it is slidable.

The chief object of this invention is to provide a system of this kind which is better adapted to meet the requirements of practice than those used at the present time, and, in particular, which is quicker and safer to operate.

The main feature of this invention consists in arranging the means for controlling the locking and release of the glass pane so as to insure, once the glass pane has been released, the automatic return of said locking device into active position after a given period of time during which the sliding glass pane can be displaced at will.

Preferred embodiments of the present invention will be hereinafter described with reference to the accompanying drawings, given merely by way of example and in which:

FIG. 4 is a corresponding side view.

FIG. 5 is a sectional view on the line V—V of FIG. 4.

FIG. 6 is a view similar to FIG. 4 but showing the parts in the position they occupy when the locking device is out of action.

Figure 1:
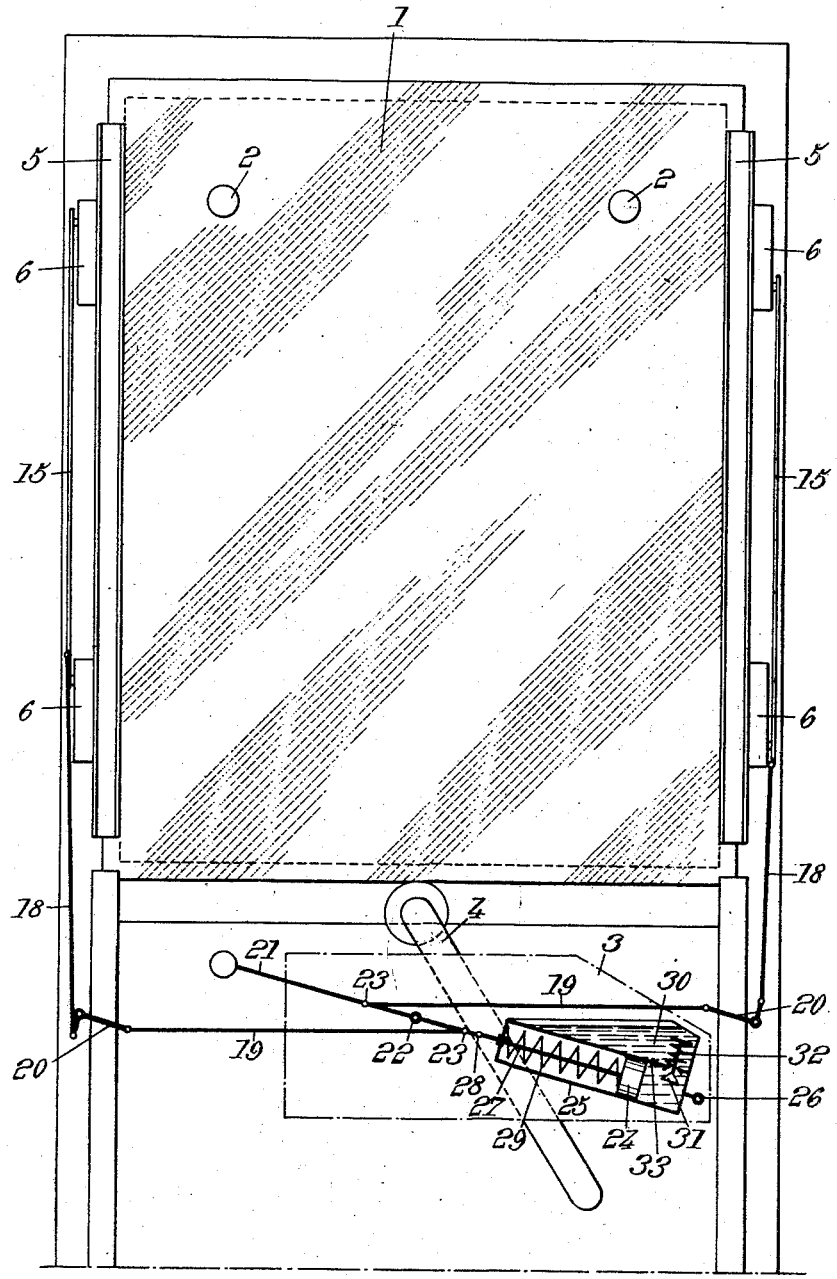
FIGS. 1 and 2 are elevational views of a system according to the present invention, respectively in the position for which the locking device is in action and in a position where it is temporarily out of action.

The system according to the present invention is used to control a glass pane 1 (for instance in a railway-car, a ship or the like). Said glass pane 1 is slidable in suitable guides provided in a window frame. It may be displaced either directly by hand (by means of knobs such as 2) or by means of a crank handle acting through a suitable transmission. The system may include means for balancing the weight of the glass pane, as diagrammatically shown at 3, said means operating through an arm 4.

The device for locking glass pane 1 in any given position and the means for controlling said device are arranged in such manner that, after said device has been temporarily placed out of action, it can be automatically returned into active position at the end of an interval of time sufficient to permit of moving the glass pane from the position it occupied to the new desired position thereof.

Advantageously, the means which place the locking device out of action are arranged in such manner that, when they are operated, they store up an amount of energy which they release after a given time to return the locking device into active position, said time being suitably adjusted, for instance by means of a dash-pot.

The device for locking the glass pane in position (which includes means for exerting a pressure on the glass pane either transversely thereto, as it will be hereinafter supposed, or against the edges thereof and in its plane) may be constituted for instance Either by mechanical elements as illustrated on the drawings, in which case the connection between said device and its control means is advantageously a mechanical one, as illustrated by the drawings Or by a hydraulic (or pneumatic) system in particular as disclosed in my U.S. patent application Ser. No. 703,-301 of December 17, 1957 for "Improvements in systems including sliding elements and in particular glass panes," which has now become abandoned.

The control means preferably includes a single instrumentality for controlling several pressure exerting means simultaneously, this single instrumentality being advantageously constituted by A piston or the like operatively connected with the pressure exerting means and movable against the action of resilient means constituting an energy accumulator (resilient bag, rubber element or metal spring) and A dash-pot advantageously constituted by a fluid-tight chamber filled with liquid or air in response to the operation of said piston and which is emptied during the return movement of said piston under the action of the energy stored up by said accumulator so as to flow through a calibrated orifice (possibly adjustable), and therefore at a predetermined speed.

An embodiment of this invention is shown by the drawing.

In this embodiment, the pressure exerting means is constituted by two bars 5 disposed respectively on the two sides of the window frame, each of these bars being operable by two mechanical devices 6 (FIGS. 1 and 2) the detail of which is shown by FIGS. 3 to 6.

Each of these devices 6 includes a spindle 7 extending through the corresponding bar 5 and on which is pivoted a lever 8. This lever 8 is pivoted at one end 9 on a support 10 fixed with respect to the window frame. The other end of lever 8 is hinged at 16 to a link 12 interposed between lever 8 and a bent lever 13 pivoted at 14 to support 10 or an extension thereof. This device is operated by means of a control rod 15 pivoted at 11 about the axis common to link 12 and bent lever 13.

Figure 3:
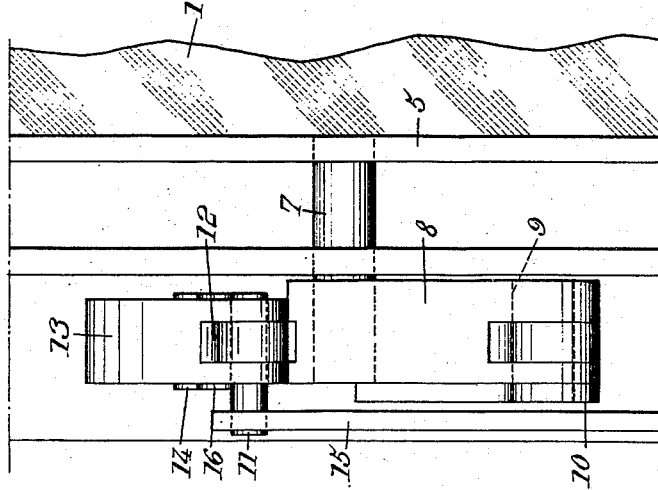
FIG. 3 is a side view of a portion of the mechanism of FIGS. 1 and 2.

Such a mechanism is capable of occupying two operative positions as shown on FIGS. 4 and 6 respectively. In the position of FIG. 4, the three axes 11, 14 and 16 are substantially in line so as to have a knuckle-joint effect. This is the position in which bar 5 is pressed against glass pane 1 (FIGS. 3, 4 and 5). The movement of this mechanism is not reversible so that it can support the pressure exerted on the glass pane 1 without risk of being pushed back.

The position of FIG. 6 is the release position. It is obtained by pushing said rod 15 in the direction of arrow $f$ (FIG. 4) so that axes 11, 14 and 16 come into the respective positions shown by FIG. 6. In this case, spindle 7 which connects lever 8 with bar 5 is moved in the direction of arrow $f_1$ (FIG. 4), that is to say away from the glass pane.

Advantageously, as shown by FIG. 5, glass pane 1 in the locked position is pressed against a hollow packing member of tubular shape, as shown at 17. When the glass pane is released, this member 17 returns to its initial shape as shown in dotted lines on FIG. 5.

Rods 15 are operated as follows.

They are controlled from a distance from a central control device through links 18, 19 and bell-crank levers 20.

The central control device includes the following elements:

A control lever 21 pivotable about a fixed axis 22 and on which the two corresponding links 19 are hinged at 23—23;

A piston 24 such as above mentioned moving in a cylinder 25 pivoted about a fixed point 26, the rod 27 of this piston being hinged at 28 on the control lever 21;

A spring 29 as above mentioned adapted to cooperate with piston 24 and constituting the energy storing means; and A dash-pot constituted by an auxiliary chamber 30 adjoining cylinder 25 and communicating therewith on the one hand through a hole of substantial dimension controlled by a check valve 31 provided with a spring 32 and on the other hand through at least one calibrated orifice 33.

FIG. 1 shows the position of the system for locking the the glass pane 1 in position.

Figure 2:
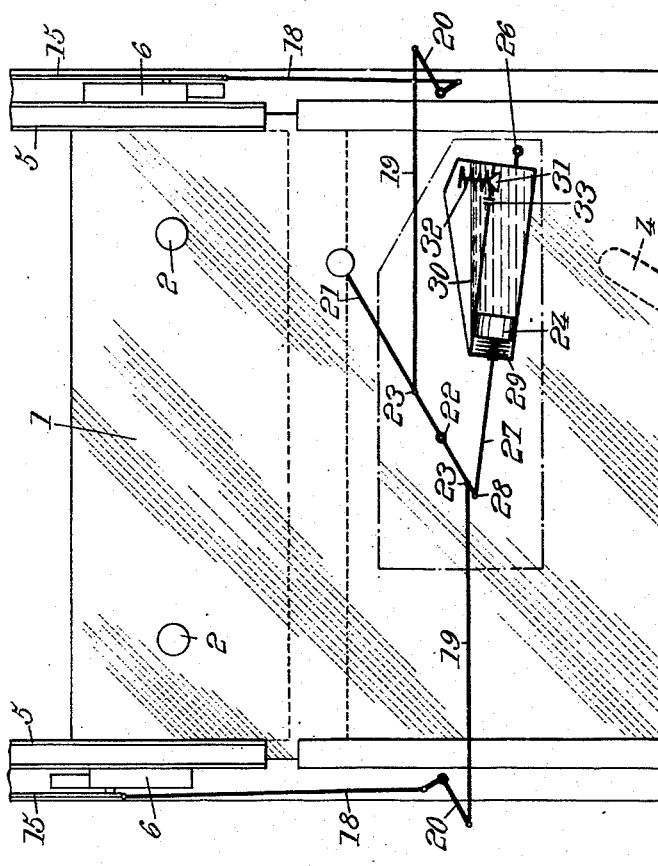

FIG. 2 shows the same system in released position, piston 24 having compressed spring 29 while sucking liquid into the cylinder past valve 31.

As soon as the operator releases control lever 21, spring 29 pushes back piston 24 but at a relatively slow speed due to the fact that valve 31 is closed and the liquid can escape from the cylinder only through calibrated orifice 33.

Thus, a time period is provided between the operation of lever 21 and the return of the system into its initial position under the action of spring 29. During this time period the operator is free to move glass pane 1 to bring it into the desired position.

The locking of said glass pane in said new position is achieved automatically.

It should also be noted that piston 24 may be operated through means different from lever 21 and that its operation might be combined with another device for controlling the position of the glass pane.

The system above described may permit dispensing with a device for balancing the weight of the glass pane since the locking means holds the glass pane in position.

In a general manner, while I have, in the above description, disclosed what I deem to be practical and efficient embodiment of my invention, it should be well understood that I do not wish to be limited hereto as there might be changes made in the arrangement, disposition and form of the parts without departing from the principle of the present invention as comprehended within the scope of the accompanying claims.

What I claim is:

1. A window construction comprising a frame, a pane slidably movable relative to said frame, members adjacent said pane and displaceable to urge said pane against said frame to lock said pane in position, lever systems coupled to said members to displace the same, control means coupled to said lever systems to control the displacement of said members, said control means having release and lock positions and being manually displaceable from said lock to said release position, and delay means connected to said control means and urging the same from said release to said lock position with a determinable delay.

2. A construction as claimed in claim 1 wherein said delay means includes a dashpot coupled to said control means and providing said determinable delay.

References Cited in the file of this patent
UNITED STATES PATENTS

| | | |
|---|---|---|
| 588,793 | Dorr et al. | Aug. 24, 1897 |
| 799,089 | Ralston | Sept. 12, 1905 |
| 1,764,154 | Cramer | June 17, 1930 |
| 2,675,589 | Utley et al. | Apr. 20, 1954 |
| 2,701,394 | Anderson | Feb. 8, 1955 |